US006506479B1

(12) United States Patent
Horiuchi

(10) Patent No.: US 6,506,479 B1
(45) Date of Patent: Jan. 14, 2003

(54) INK JET RECORDING PAPER

(75) Inventor: Hiroyuki Horiuchi, Saitama (JP)

(73) Assignee: Nisshinbo Industries, Inc., Tokyo (JP)

( * ) Notice: Subject to any disclaimer, the term of this patent is extended or adjusted under 35 U.S.C. 154(b) by 71 days.

(21) Appl. No.: 09/597,566

(22) Filed: Jun. 20, 2000

(30) Foreign Application Priority Data

Sep. 2, 1999 (JP) ........................................... 11-248695

(51) Int. Cl.[7] ................................................. B32B 3/00
(52) U.S. Cl. ...................................................... 428/195
(58) Field of Search ................................ 428/195, 381, 428/560

(56) References Cited

U.S. PATENT DOCUMENTS 5,185,213 A * 2/1993 Fujita et al. ................ 428/500
5,284,815 A 2/1994 Uytterhoeven et al.
5,328,749 A 7/1994 Noda et al.
5,364,702 A 11/1994 Idei et al.
5,472,757 A 12/1995 Ogawa et al.
5,570,120 A 10/1996 Sakaki et al.
5,583,553 A 12/1996 Shirota et al.
5,631,076 A 5/1997 Hakomori et al.
5,643,709 A 7/1997 Kamio et al.
5,912,085 A * 6/1999 Ito et al. ...................... 428/500
5,928,990 A 7/1999 Guistina et al.
5,939,355 A 8/1999 Burns et al.
5,989,378 A 11/1999 Liu et al.

FOREIGN PATENT DOCUMENTS

EP 826508 * 8/1997 ............ B41M/5/00
JP 60-189480 9/1985
JP 61-57379 3/1986

* cited by examiner

*Primary Examiner*—Bruce H. Hess
*Assistant Examiner*—Michael E. Grendzynski
(74) *Attorney, Agent, or Firm*—Duane Morris LLP

(57) ABSTRACT

The present invention is to provide an ink jet recording paper which is free from blurring, exhibits a highly developed color and has such a strength as to prevent a laminate film and an ink-receiving layer from being peeled by the wind or rain when the paper is posted outdoors after the appropriate film is laminated. The ink jet recording paper is provided with an ink-receiving layer, containing at least a resin and a pigment, on a substrate, wherein major components forming an anchor coating layer of the receiving layer are a styrene/acryl copolymer resin having a glass transition point of 0° C. or more and 20° C. or less and calcium carbonate.

1 Claim, No Drawings

INK JET RECORDING PAPER

BACKGROUND OF THE INVENTION

1. Field of the Invention

The present invention relates to ink jet recording paper which is advantageously used when fine liquid droplets, e.g., aqueous ink are jetted from a nozzle to print a monochrome or full-color image nobly thereby making a poster or a signboard.

2. Description of the Related Art

Conventionally, current recording systems include, for example, a heat melting type thermal transfer system, sublimation type thermal transfer system, electrophotographic system and ink jet system. In recent years, an ink jet recording system have been dominantly used in view of calm sound during recording, high speediness, suitability to the recording of a large-sized image and running costs. While, there have been increased needs of making full-color and large-sized posters, signboards or the like in small lots and delivering in a short time and hence an ink jet printer using aqueous ink has attracted remarkable attention.

In the aforementioned situation, it is demanded of large-sized ink jet recording paper to be used outdoors that when an appropriate film is laminated on an ink-receiving layer and the paper is posted outdoors after a printing is made on the ink-receiving layer, the laminated film and the ink-receiving layer are not peeled when the paper is fluttered in the wind or submersed under rain water.

However, when hydrophilic components are contained in the ink-receiving layer in a large amount even if the ink-receiving layer is coated with a laminate film, water such as rain water enters toward the center of the paper through the ink-receiving layer from the non-laminated end surface of the recording paper, rendering the peeling easy.

Generally, interfacial peeling or cohesive failure arises in the most weakened interface or layer. In the case as aforementioned, it is inferred that water reaches the interface between the ink-receiving layer and an anchor coating layer which applies the receiving layer to a substrate to weaken the adhesive strength of the interface, causing peeling. Here, the interfacial peeling means the case where peeling takes place at the boundary with which each layer is in contact and the cohesive failure means the case where a layer itself is broken and peeled.

It is to be noted that the adhesive strength between the ink-receiving layer and the laminate film adhesive layer is needed to stand against the fluttering in the wind and the adhesive strength obtained after a laminate film is applied and soaked in water is needed to stand against the submersion under water.

Various improved techniques have been developed to solve the peeling problem as aforementioned.

If the amount of hydrophilic cationic components to be added to the ink-receiving layer is decreased to deal with the problem as aforementioned, the reduction in adhesive strength when the paper is submerged under rain water is restrained but the fixing ability of ink is decreased due to the reduction in the amount of cationic components and there is a possibility of bleeding of ink.

There is a method of improving adhesive strength by increasing the content of a resin in the ink-receiving layer. However, in this method, the ink-absorbing power is hindered and there is a fear that the bleeding of ink and drying inferior are caused.

SUMMARY OF THE INVENTION

Accordingly it is an object of the present invention to provide a new ink jet recording paper having high peeling strength so as to provide high laminate peeling strength in a dry condition, of course, and when the paper is submerged under water even if a cationic ink-fixing agent and filler are added in a considerable amount in an ink-receiving layer.

The structure of the present invention which has been made for the purpose of solving the above problems is characterized in that, in an ink jet recording paper provided with an ink-receiving layer, containing at least a resin and a pigment, on a substrate, major components forming an anchor coating layer of the receiving layer are a styrene/acryl copolymer resin having a glass transition point of 0° C. or more and 20°C. or less and calcium carbonate.

Specifically, the ink jet recording paper of the present invention comprises a substrate, an anchor coating layer formed on at least one surface of the substrate and an ink-receiving layer disposed on the anchor coating layer. Major components forming the anchor coating layer are a styrene/acryl copolymer resin having a glass transition point of 0° C. or more and 20°C. or less and calcium carbonate. Therefore, even if a cationic ink-fixing agent and filler are added to the ink-receiving layer in a considerable amount, no interfacial peeling takes place at the interface between the ink-receiving layer and the anchor coating layer. Also, laminate peeling strength can be improved by mixing the styrene/acryl copolymer resin and calcium carbonate in the anchor coating layer in a specific solid weight ratio. Specifically, ink jet recording paper having a dry laminate peeling strength of 7000 N or more and wet laminate peeling strength of 800 N or more can be obtained. As the aforementioned calcium carbonate, an aragonite type may be used.

DESCRIPTION OF THE PREFERRED EMBODIMENTS

An embodiment of the present invention will be hereinafter explained in detail.

In the basic layer structure of the ink jet recording paper of the present invention, an anchor coating layer is formed on at least one surface of a substrate and an ink-receiving layer is disposed on the coating layer. As required, a foam plastic film for improving the carriage ability and an adhesive layer provided with peelable paper applied to the outer surface thereof may be formed on the other surface of the substrate.

Given as examples of the substrate used for the recording paper of the present invention are plastic films and synthetic papers. They may be provided with voids in the inside thereof and made opaque by adding a filler. They may also be provided with corona treatment or adhesion-easing treatment to improve the adhesive property and the wettability. The thickness of the substrate is 10 to 400 $\mu$m and preferably 50 to 200 $\mu$m.

Next, the anchor coating layer formed on the substrate comprises a resin used primarily as an adhesive and a pigment used as an adhesion-improver.

As the resin for the anchor coating layer, a styrene/acryl copolymer resin having a glass transition point Tg of 0° C. or more and 20° C. or less. As the pigment, calcium carbonate is used.

The action mechanism by which the anchor coating layer produced by mixing the styrene/acryl copolymer resin having a glass transition point Tg falling in the above range and calcium carbonate and applying the mixture improves the water resistance is not clear. However, it is thought that when water, e.g., rain water, penetrates to the ink-receiving layer as the top coating layer and reaches the interface between the top coating layer and the anchor coating layer, the anchor coating layer scarcely absorbs water. Then, the hydrophilic resin of the top coating layer is swollen by water and is reduced in the adhesion to the anchor coating layer. At this time, when calcium carbonate exists in the anchor coating layer, cracks are formed in the surface layer of the anchor coating layer and the top coating layer penetrates into the cracks thereby improving the bonding strength.

Also, it is inferred that the presence of calcium carbonate in the anchor coating layer lowers the smoothness of the surface of the coating layer and improves the wettability when the top coating layer is applied, thereby improving the adhesion.

In the case where the blocking of the anchor coating layer takes place when calcium carbonate is independently used as a pigment, an organic or inorganic filler such as a plastic pigment or silica may be optionally added.

Among calcium carbonates, aragonite types are particularly preferred. The crystal forms of calcium carbonate are divided into hexagonal calcite types, vaterite types and prismatic aragonite types. There is a tendency that the aragonite type has stronger wet laminate strength than other types.

The ratio F/R of the solid weight (F) of calcium carbonate to the solid weight (R) of the styrene/acryl copolymer resin in the anchor coating layer is 0.1 to 0.5. When the weight ratio F/R falls in the above range, the laminate peeling strength in both dry and wet conditions is improved.

The thickness of the anchor coating layer is 0.1 to 10 μm and preferably 0.5 to 7 μm. This thickness of the anchor coating layer is closely related to the laminate peeling strength. Even if the ink-receiving layer is thin or thick, the laminate peeling strength is weakened.

The ink-receiving layer to be disposed on the anchor coating layer comprises a resin, a pigment and the like.

Examples of the resin may include starches such as starch oxide and esterified starch, cellulose derivatives such as carboxymethyl cellulose and hydroxyethyl cellulose, casein, gelatin, soybean protein and hydrophilic resins such as polyvinyl alcohol and its derivatives.

Examples of the pigment of the ink-receiving layer may include silica, calcium carbonate, porous calcium carbonate, aluminum hydroxide, diatomaceous earth, talc, clay, calcined kaolin, polystyrenes and polymethacrylates, which have high ink-absorbance.

An ink fixing agent may be added to the ink-receiving layer to further develop a color. Examples of the fixing agent which is a cationic material may include polyether quaternary ammonium salts, quaternary polyammonium salts, polyamidoepichlorohydrin/methacrylic acid ethyltrimethylammonium chloride type materials and cationic colloidal silica.

The amount of the ink-fixing agent to be added is 1 to 25% and preferably 5 to 20% based on the solid weight in the coating solution. If the amount is less than 1%, no effect of improving color development is obtained whereas even if the amount exceeds 25%, the effect of improving color development is not changed and water resistance is deteriorated.

The thickness of the ink-receiving layer is 1 to 80 μm and preferably 5 to 60 μm. The thickness of the receiving layer is intimately related to the ink-absorbance and color-developing ability. When the receiving layer is thin, the color developing ability is bettered but there is the case where the absorbance is deteriorated and an image is blurred. When the receiving layer is thinner than 1 μm, the absorbance of the receiving layer is impaired and an image is blurred by the bleeding of ink, though the lower limit of the thickness of the receiving layer depends upon the amount of ink to be jetted.

When the ink-receiving layer is thick, the absorbance is bettered. However, there is the case where ink sinks down, which deteriorates color-developing ability. The upper limit of the thickness of the receiving layer depends upon the amount of ink to be jetted in a printer and even if the ink-receiving layer is thicker than 80 μm, this only results in that the absorbing capacity is larger than the amount of ink to be jetted and color development is impaired on the contrary. Moreover, too high thickness results in drying difficulty and leads also to evils such as surface cracks and is hence undesirable.

When dry laminate peeling strength is 7000 N or more, peeling caused by the influence of the wind and the like arises with difficulty. When the wet laminate peeling strength is 800 N or more, neither peeling nor floating resulting from the submersion of the receiving layer under water such as rain water occurs. The laminate peeling strength so-called here means the interfacial peeling strength of the ink-receiving layer against the anchor coating layer and/or the strength of the ink-receiving layer against cohesive failure. It is inferred that in the recording paper of the present invention, the cohesive failure of the ink-receiving layer or the interfacial peeling between the ink-receiving layer and the anchor coating layer occur in a dry condition and the interfacial peeling between the ink-receiving layer and the anchor coating layer occurs in a wet condition. In addition, N means "Newton".

As the method for the application of the anchor coating layer and ink-receiving layer, various methods such as well-known reverse roll coating, air-knife coating, gravure coating, blade coating and comma coating may be used.

The recording paper of the present invention which is obtained in the above manner uses a specific anchor coating layer, whereby the paper is strengthened in terms of laminate strength even if a cationic component used to prevent the blurring of an image and to improve color developing is added in a proper amount. Therefore, the recording paper of the present invention has such a significant effect as to prevent a laminate film, of course, or the ink-receiving layer together with the laminate film from being peeled from a substrate even by the influence of the wind or rain.

EXAMPLES

The present invention will be explained by way of examples and comparative examples. In the following explanations, all designations of parts and % indicate parts by weight and weight percentage (wt. %), respectively, unless otherwise noted.

Example 1

A process for producing an anchor coating of the following composition 1 on one surface of a plastic film (Toyopearl P4257, manufactured by Toyobo) with a thickness of 80 μm was carried out and thereafter a coating solution of the following composition 2 was applied to the anchor coating to form an ink-receiving layer with a coating thickness of 35 μm.

| | |
|---|---|
| [Composition 1] | |
| Styrene/acryl copolymer resin (Acronal YJ-6221D, solid content: 50%, manufactured by BASE Dispersion) | 61.6 parts |
| Aragonite type calcium carbonate (Callite SA, manufactured by Shiraishi Central Laboratory) | 9.20 parts |
| Dispersant (Carybon L-400, manufactured by Sanyo Chemical Industries) | 0.50 parts |
| Water | 28.7 parts |
| [Composition 2] | |
| Polyvinyl alcohol (PVAR-1130, manufactured by Kuraray) | 4.4 parts |
| Silica (Mizcasil P-78F, manufactured by Mizusawa Chemical Industry) | 7.7 parts |
| Calcined kaolin (Altowhite TE, manufactured by Showa Chemical Industry) | 1.9 parts |
| Ink-fixing agent (Polyfix 700, manufactured by Showa Highpolymer) | 4.1 parts |
| Alumina sol (Alumina Sol 200, solid content: 10%, manufactured by Nissan Chemical Industries) | 8.6 parts |
| Fluorescent whiteness-improving agent (Brankphor UW Liquid, solid content: 50%, manufactured by Bayer AG) | 0.3 parts |
| Nonionic surfactant (SN Deformer 480, solid content: 100%, manufactured by Sannopco) | 0.2 parts |
| Water | 72.3 parts |

Example 2

A process for producing an anchor coating of the following composition 3 on one surface of a plastic film (Toyopearl P4257, manufactured by Toyobo) with a thickness of 80 μm was carried out and thereafter a coating solution of the aforementioned composition 2 was applied to the anchor coating to form an ink-receiving layer with a coating thickness of 35 μm.

[Composition 3]

| | |
|---|---|
| Styrene/acryl copolymer resin (Acronal YJ-6221D, solid content: 50%, manufactured by BASE Dispersion; | 72.6 parts |
| Aragonite type calcium carbonate (Callite SA, manufactured by Shiraishi Central Laboratory) | 3.6 parts |
| Dispersant (Carybon L-400, manufactured by Sanyo Chemical Industries) | 0.6 parts |
| Water | 23.0 parts |

Example 3

A process for producing an anchor coating of the following composition 4 on one surface of a plastic film (Toyopearl P4257, manufactured by Toyobo) with a thickness of 80 μm was carried out and thereafter a coating solution of the aforementioned composition 2 was applied to the anchor coating to form an ink-receiving layer with a coating thickness of 35 μm.

[Composition 4]

| | |
|---|---|
| Styrene/acryl copolymer resin (Acronal YJ-6221D, solid content: 50%, manufactured by BASF Dispersion) | 53.0 parts |
| Aragonite type calcium carbonate (Callite SA, manufactured by Shiraishi Central Laboratory) | 13.3 parts |
| Dispersant (Carybon L-400, manufactured by Sanyo Chemical Industries) | 0.4 parts |
| Water | 32.8 parts |

Example 4

A process for producing an anchor coating of the following composition 5 on one surface of a plastic film (Toyopearl P4257, manufactured by Toyobo) with a thickness of 80 μm was carried out and thereafter a coating solution of the aforementioned composition 2 was applied to the anchor coating to form an ink-receiving layer with a coating thickness of 35 μm.

[Composition 5]

| | |
|---|---|
| Styrene/acryl copolymer resin (Acronal YJ-6221D, solid content: 50%, manufactured by BASF Dispersion) | 61.6 parts |
| Calcite type calcium carbonate (Light calcium carbonate, manufactured by Maruo Calcium) | 9.20 parts |
| Dispersant (Carybon L-400, manufactured by Sanyo Chemical Industries) | 0.50 parts |
| Water | 28.7 parts |

Comparative Example 1

A process for producing an anchor coating of the following composition 6 on one surface of a plastic film (Toyopearl P4257, manufactured by Toyobo) with a thickness of 80 μm was carried out and thereafter a coating solution of the aforementioned composition 2 was applied to the anchor coating to form an ink-receiving layer with a coating thickness of 35 μm.

[Composition 6]

| | |
|---|---|
| Styrene/acryl copolymer resin (Acronal YJ-6221D, solid content: 50%, manufactured by BASF Dispersion) | 50.0 parts |
| Water | 50.0 parts |

Comparative Example 2

A process for producing an anchor coating of the following composition 7 on one surface of a plastic film (Toyopearl P4257, manufactured by Toyobo) with a thickness of 80 μm was carried out and thereafter a coating solution of the aforementioned composition 2 was applied to the anchor coating to form an ink-receiving layer with a coating thickness of 35 μm.

[Composition 7]

| | |
|---|---|
| Styrene/acryl copolymer resin (Acronal YJ-3042D, solid content: 50%, manufactured by BASF Dispersion) | 61.6 parts |
| Aragonite type calcium carbonate (Callite SA, manufactured by Shiraishi Central Laboratory) | 9.2 parts |
| Dispersant (Carybon L-400, manufactured by Sanyo Chemical Industries) | 0.5 parts |
| Water | 28.7 parts |

Comparative Example 3

A process for producing an anchor coating of the following composition 8 on one surface of a plastic film (Toyopearl P4257, manufactured by Toyobo) with a thickness of 80 μm was carried out and thereafter a coating solution of the aforementioned composition 2 was applied to the anchor coating to form an ink-receiving layer with a coating thickness of 35 μm.

[Composition 8]

| | |
|---|---|
| Styrene/acryl copolymer resin (Acronal YJ-1100D, solid content: 50%, manufactured by BASF Dispersion) | 61.6 parts |
| Aragonite type calcium carbonate (Callite SA, manufactured by Shiraishi Central Laboratory) | 9.2 parts |
| Dispersant (Carybon L-400, manufactured by Sanyo Chemical Industries) | 0.5 parts |
| Water | 28.7 parts |

All of the ink jet recording papers obtained in the above Examples 1 to 4 and Comparative Examples 1 to 3 were measured for dry laminate peeling strength and wet laminate peeling strength. The laminate peeling strength was determined as follows: a commercially available laminate film was applied to the surface of a 50-mm-wide ink-receiving layer in a thickness of 100 mm, the laminate film and the paper were respectively pulled with a load in directions at 180 degrees to each other to measure force when the both were peeled from each other and the measured force was determined as the laminate peeling strength. The dry laminate strength was the laminate strength measured for the applied laminate as it was and the wet laminate strength was the laminate strength measured for the applied laminated after it was soaked in water for 24 hours. The measurement was made using Strograph-VB10 manufactured by Toyo Seiki according the Tensile Strength Test of JIS P-8113. The results of the measurement are as shown in Table 1.

TABLE 1

| | F/R | Tg of resins (° C.) | Crystal form | Laminate peeling strength (dry) (N) | Laminate peeling strength (wet) (N) |
|---|---|---|---|---|---|
| Example 1 | 0.3 | 10 | Aragonite | 10,200 | 1,980 |
| Example 2 | 0.1 | 10 | Aragonite | 14,700 | 1,020 |
| Example 3 | 0.5 | 10 | Aragonite | 9,700 | 3,200 |
| Example 4 | 0.3 | 10 | Calcite | 9,400 | 820 |
| Comparative Example 1 | 0 | 10 | — | 19,600 | 630 |
| Comparative Example 2 | 0.3 | −15 | Aragonite | 2,940 | 250 |
| Comparative Example 3 | 0.3 | 30 | Aragonite | 1,800 | 100 |

What is claimed is:

1. An ink jet recording paper comprising:

a substrate;

an anchor coating layer adjacent said substrate, said anchor coating layer comprising a styrene/acryl copolymer resin having a glass transition point of 0° or more and 20° or less; and aragonite type calcium carbonate;

an ink receiving layer adjacent said anchor coating layer comprising:

a resin; and a pigment, wherein the ratio F/R of the solid weight (F) of the calcium carbonate to the solid weight (R) of the styrene/acryl copolymer resin in the anchor coating layer is 0.1 to 0.5.

* * * * *